Nov. 1, 1927.
O. D. BANG
1,647,556
MEASURING DEVICE
Filed May 17, 1924   2 Sheets-Sheet 1
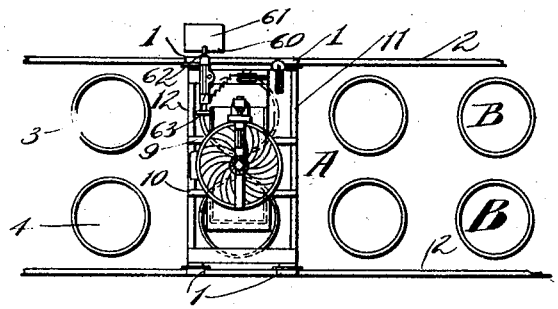
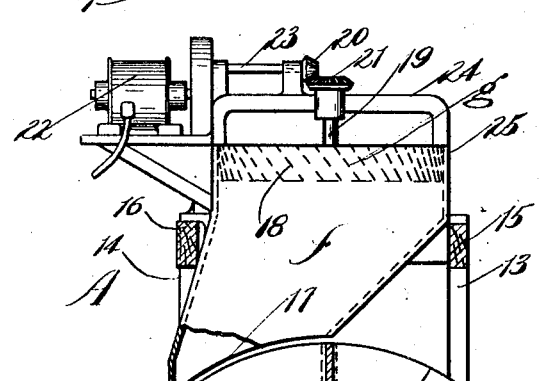
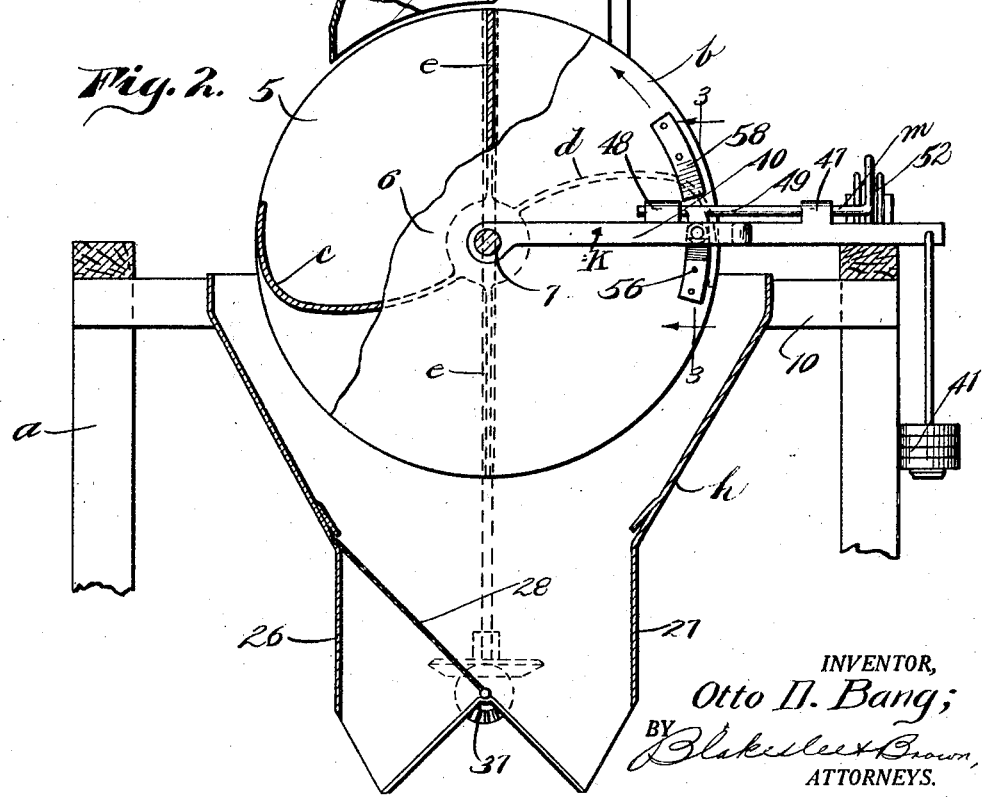
INVENTOR,
Otto D. Bang;
BY Blakeslee & Brown,
ATTORNEYS.

Nov. 1, 1927.
O. D. BANG
1,647,556
MEASURING DEVICE
Filed May 17, 1924  2 Sheets-Sheet 2
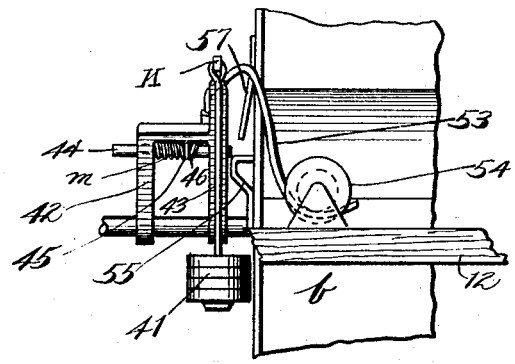
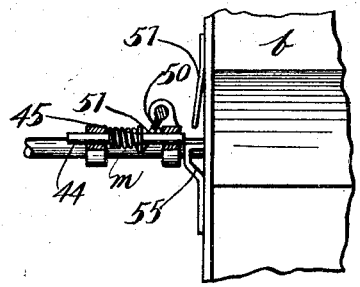
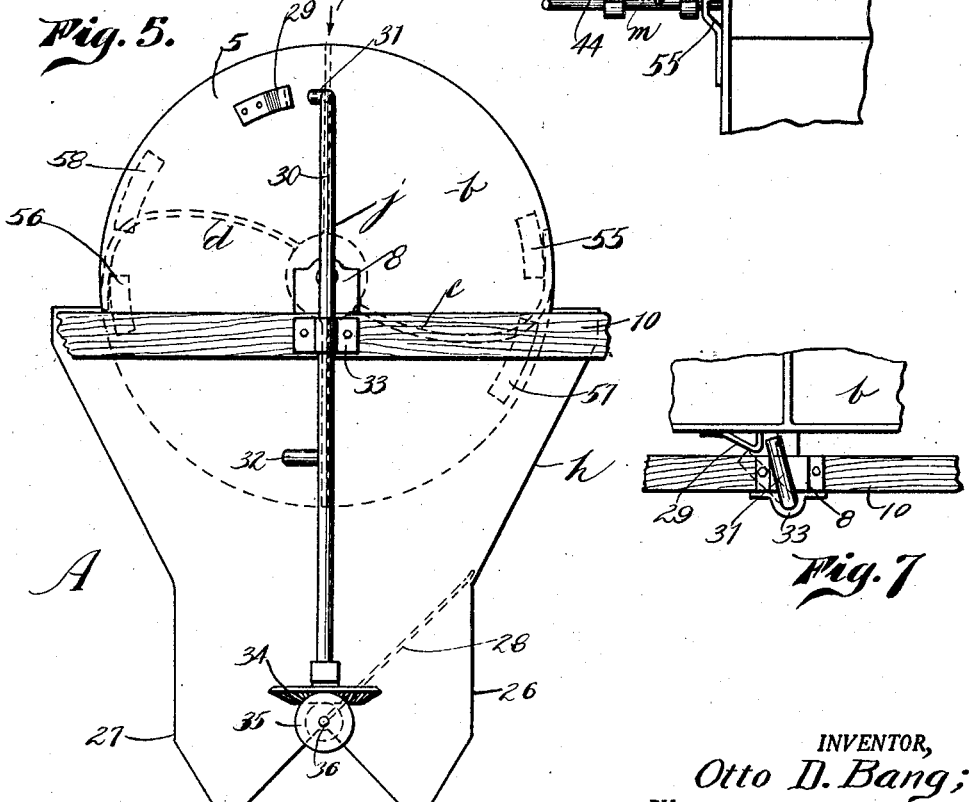
INVENTOR,
Otto D. Bang;
BY Blakeslee & Brown,
ATTORNEYS.

Patented Nov. 1, 1927.

1,647,556

UNITED STATES PATENT OFFICE.

OTTO D. BANG, OF LOS ANGELES, CALIFORNIA.

MEASURING DEVICE.

Application filed May 17, 1924. Serial No. 713,959.

This invention relates broadly to measuring devices, and more specifically to a device which may be used for a variety of purposes such as for instance the making of kraut.

In the manufacture of kraut, commonly called sauer kraut, the general procedure is to provide a large drum within which men are placed and cabbage is shredded and then delivered to the drum where the men salt the same and stamp it down. It often happens that the shredded cabbage is delivered to the men at a greater speed than they can possibly salt the same, with the result that part of the cabbage is not properly salted. The present invention has for one of its objects a machine which will deliver weighed or measured quantities of a commodity such as shredded cabbage at a determined rate, so that the same may be conveniently worked.

The invention has for a further object the provision of a machine which is simple in construction, compact, which operates rapidly, has few parts to get out of order, and which is generally superior in point of relative simplicity, taken in conjunction with facility and ease of operation.

With the above and other objects in view, the invention consists in the novel and useful provision, formation, construction, association and relative arrangement of parts, members and features, all as shown in certain of its embodiments in the accompanying drawings, described generally, and more particularly pointed out in the claims:

In the drawings:

Figure 1 is a top plan view, partly fragmentary, showing the improved measuring device mounted on wheels above drums;

Figure 2 is a fragmentary side elevation, on an enlarged scale, parts being sectioned, of the improved measuring device;

Figure 3 is a view taken on the line 3—3 of Figure 2, and partly in section, showing a releasing means for a drum member of the measuring device;

Figure 4 illustrates further details of releasing means for the drum;

Figure 5 is a partial fragmentary view of the measuring device, being an elevation on the side opposite the elevation shown in Figure 2;

Figure 6 is a view similar to Figure 3, and showing a second position of a portion of the releasing means; and, Figure 7 is a fragmentary partial plan view looking in the direction of the arrow 7 in Figure 5.

Corresponding parts in all the figures are designated by the same reference characters.

Referring with particularity to the drawings, the improved measuring device is designated as an entirety and in one embodiment by A, of which $a$ is a frame or carriage member adapted in the embodiment shown to be mounted upon wheels 1, which wheels may if desired ride on a track-way 2. In the showing of Figure 1 the trackway is located above certain drums $b$, which drums are adapted to receive material delivered to the same by the device A. As stated in the preamble, when this device is used in the manufacture of sauer kraut men are placed in the individual drums, the drums may be in spaced pairs as shown at 3 and 4, and a measured quantity of the cut cabbage is delivered first to one drum and then to the other drum, so that the men within such drums will have plenty of time to salt such cabbage to properly form sauer kraut. The device A in addition to including the frame member $a$ mounted on wheels as aforesaid, includes a member $b$ in the form of a drum, in that it has end members 5 and 6, with the drum mounted on an axle or shaft 7, which axle or shaft is suitably carried in bearings 8 supported on the members 9 and 10 of the frame member $a$. It is to be noted that the members 9 and 10 of the frame member are in turn mounted upon further members 11 and 12 of such frame member considered as an entirety. The drum $b$ is provided with bin members $c$ and $d$, which bin members are diametrically disposed within such drum, and it will be noted that the bins are curved so as to suitably contain and hold material received within the same and between the ends 5 and 6 of the drum. In addition a diametric spacer or partition $e$ is provided within the drum member. Thus, any material received within, say, the bin $c$, will be received between one-half of the partition $e$, and such bin, as well as the ends of the drum. The frame member $a$ is provided with uprights 13 and 14, upon which are mounted cross pieces 15 and 16, and such uprights and cross-pieces support immediately above the drum member $b$ a hopper $f$. This hopper is so formed as to have the delivery chute portion shown at 17 deliver material to one bin at a time, that in Figure 2 showing that the hopper is in a position to deliver to the bin c. Likewise the hopper is so formed as to contain a shredding device g, which shredding device comprises spirally formed knife elements 18 suitably joined to a shaft 19, which shaft in turn may be driven through the medium of beveled gears 20 and 21, in turn associated with the source of propulsion as a motor 22, through the medium of a shaft 23, there being a frame member 24 associated with the cross-pieces 15 and 16 of the frame a for supporting such motor and associated elements. Thus in actual operation an operator would stand upon a suitable platform, and when the motor is in operation, the spiral knives will be turning rapidly and a commodity such as cabbage held against such spiral knives would be shredded and delivered by the hopper f to one or the other of the bins c or d. It is noted that the hopper f is annularly formed at the portion 25 where it encloses the periphery of the knives 18. Located immediately below the drum b and partially surrounding the same and carried by the cross-pieces 9 and 10, is a delivery hopper h. As shown, this delivery hopper is provided at its lower end with breech portions 26 and 27, with a damper member 28 located intermediate such breech portions. This damper member is adapted to be moved back and forth so as to either open one breech portion and close the other, or vice versa, so that the material received and delivered from the bins will be alternately delivered first through one delivery breech and then through the other. The end 5 of the drum b is provided with a projecting member 29 which is adapted to contact with damper actuating means j and which means comprises a shaft 30 provided with projections 31 and 32, and which shaft is carried in a suitable bearing member 33 associated with one of the frame members, the lower end of such shaft carrying a beveled gear 34 adapted to mesh with a beveled gear 35 mounted on the shaft 36, carried on a member 37 between the breech portions 26 and 27. The projections 31 and 32 are so related that a partial turn or movement thereof will cause the damper to move from a position closing one breech to a position closing the opposite breech. Thus in the showing of Figure 5 the projecting member 29 would contact with the projection 31 of the shaft 30 and move the damper 28 from the dotted position of said figure so as to close the opposite breech, and when the drum had rotated 180 degrees it would contact with the second projection 32 and move the damper back to the position shown in the dotted lines of Figure 5. This movement occurs quite quickly and after the drum has made a few degrees of rotation.

I have provided releasing means k for the drum b, so that measured quantities of material will be delivered from a bin to the delivery hopper, and said releasing means includes an arm 40 loosely carried on the shaft 7 and adapted to carry weights 41 at its free end. The releasing means is so formed that a quantity of commodity such as shredded cabbage will be received upon, say, the bin c, and then when a determined weight of commodity has been received on such bin, the bin will be allowed to rotate to bring the bin d in position. The turning of the drum b is so rapid as to allow few pounds over the desired amount to be received in a bin before the drum rotates. The releasing means likewise includes means m for releasing the drum, and which means is associated with the arm 40. The arm 40 is Y-shaped, as best shown in Figures 3 and 4 at 42 and 43, and the part 43 is of greater length than the part 42, the part 42 being an extension of the part 43 forming the Y. The two portions of such arms 42 and 43 are carried on the shaft 7, as has been described. The means m for releasing the drum b includes a bolt 44 passed through aligned openings in the members 42 and 43 of the arm 40, and a coiled spring 45 surrounds such bolt and bears against a surface of the member 42 and a collar 46 carried by the bolt 44. Likewise formed on the arm 40 and particularly the member 43 thereof, are bored studs or journal members 47 and 48 within which is carried a rod 49. This rod is provided at one end with an extension 50, slotted as shown at 51. This extension 50 is adapted to be received between the collar 46 and the member 43 of the arm 40, the bolt 44 being passed through the slot 51 of the extension 50. It is thus evident that a given movement of the extension 50 will cause the same to engage the collar and retract the bolt from the position shown in Figure 3 to the position shown in Figure 6. The arm 49 is bent at an angle as shown at 52 and then curved directly downwardly, as shown at 53 to where it may engage a grooved wheel member 54 carried in a suitable bracket mounted on one of the frame members as 12. The end 6 of the drum is provided with catches 55 and 56 so positioned as to most readily engage the bolt 44, and the catches 55 and 56 are diametrically disposed on the end 6 of the drum. Likewise there is provided immediately adjacent such catches spring members 57 and 58, the purpose of such spring members being to overcome shock of the bolt 44 engaging the catches either 55 or 56 when the drum is rotated and just before same is stopped in its rotation.

The operation of the device is as follows:

Assuming the track-way 2 upon which is the carriage a and likewise assuming a plurality of parallel drum members b, an operator stands upon a platform of the frame $a$ and the material such as cabbage is shredded by the revolving knives of the means $g$ and delivered through the hopper $f$ to the bin $c$, using the showing of Figure 2. If we assume that 150 pounds of shredded cabbage is to be received within the bin $c$ before the drum is allowed to rotate, weights 41 to the amount of 150 pounds are associated with the arm 40. When the amount of material received within the bin $c$ reaches approximately 150 pounds, the arm 40 will start to lift the weights 41 and in so doing the arm 49 constituting a portion of the releasing means will tend to twist slightly and be revolved and in doing so move its extension 50 contacting with the collar 46 associated with the bolt 44 and retract the bolt from the catch 55, from the showing of Figure 3, to the showing of Figure 4 or Figure 6, which shows the arm 40 in a raised position. The moment this occurs the drum will be rotated in the direction of the arrow shown on the end 6 of Figure 2, and immediately upon the starting of such rotation the member 29 will contact with the end 31 and turn the damper 28 so that the contents of such bin $c$ will be delivered through the breech 26 of the hopper $h$ and to one of the drums $b$. The drum will continue to rotate very rapidly and the arm 40 will be returned to the neutral position such as shown in Figure 2 which will of course release the bolt 44 so that it will contact with the member 58, slowing the rotation of such drum, whereupon the bolt 44 may engage the catch 56 and stop all rotation of the drum. The bin $d$ will then be in position to receive material until a given weight has filled such bin, whereupon the drum will start to rotate and the damper 28 will be turned to the position shown in Figure 2 and the contents of such bin delivered through the breech 27. It is thus possible to time movement of the drums in step with the amount of commodity that the operators within the drums $b$ may conveniently handle to the best advantage.

Attention is directed to the fan brake shown in Figure 1 at 60, and which fan brake may consist of a flat plate 61 mounted on a shaft 62, an end of which shaft carries a friction disk 63 adapted to bear against an end of the drum $b$. This fan brake acts to slow the action when the drum and the bins associated therewith are revolved. This is a further aid in stopping movement of the bins and positioning the bins, in addition to the positive stop shown in Figures 3 and 6. It is of course obvious that I could provide a form of brake mechanism on the shaft 7 and control the movement of the drum by such brake mechanism.

It is obvious that various changes and modifications and variations may be made in practicing the invention, in departure from the particular showing, without departing from the true spirit thereof.

Having thus disclosed my invention, I claim and desire to secure by Letters Patent:

1. In a device of the character disclosed, a feeding hopper, a delivery hopper, two bin members, one of such bins being in position to receive a commodity from the feeding hopper to be delivered to the delivery hopper, means to enable such bin to be moved under the influence of a given weight of material received thereon to position the second bin between such feeding hopper and delivery hopper; means including a weighing arm adapted to hold weights, and a bolt member carried by such arm, and a catch member carried by a bin and adapted to engage such bolt to hold the bin in position until the weights on said arm are over-balanced by the weight of the material in a bin.

2. In a device of the character disclosed, a feeding hopper, a delivery hopper, two bin members, one of such bins being in position to receive a commodity from the feeding hopper to be delivered to the delivery hopper, means to enable such bin to be moved under the influence of a given weight of material received thereon to position the second bin between such feeding hopper and delivery hopper; means including a weighing arm adapted to hold weights, and a bolt member carried by such arm, and a catch member carried by a bin and adapted to engage such bolt to hold the bin in position; there being a second arm adapted to retract such bolt to permit movement of the first bin to position the second bin when the first bin has received a given weight of material in approximate accordance with the weights on the weighing arm.

3. In a device of the character disclosed, a feeding hopper, a delivery hopper, two bin members, one of such bins being in position to receive a commodity from the feeding hopper to be delivered to the delivery hopper, means to enable such bin to be moved under the influence of a given weight of material received thereon to position the second bin between such feeding hopper and delivery hopper, means for holding each bin in position until the material therein reaches a certain weight; said delivery hopper being provided with breech portions and a damper and means for operating said damper for segregating such breech portions in accordance with movement of the bins.

4. In a device of the character disclosed, a rotatable drum provided with two bin portions, a feed hopper above said drum, and a delivery hopper beneath the said drum, there being means within said delivery hopper whereby a commodity received therein may be directed therefrom in one or the other of two paths, and means between the said drum and the first named means whereby movement of the drum actuates the first named means.

5. In a device of the character disclosed, a rotatable drum provided with two bin portions, a feed hopper above said drum, and a delivery hopper beneath the said drum, there being means within said delivery hopper whereby a commodity received therein may be directed therefrom in one or the other of two paths, and means between the said drum and the first named means whereby movement of the drum actuates the first named means; in combination with means normally preventing rotation of the drum until a given weight of commodity has been received on one of the bins of said drum.

In testimony whereof, I have signed my name to this specification.

OTTO D. BANG.